(12) United States Patent
van Wijck

(10) Patent No.: US 7,966,098 B2
(45) Date of Patent: Jun. 21, 2011

(54) APPARATUS AND METHOD FOR CONTROLLING AN AMMONIA PRODUCTION SYSTEM

(75) Inventor: Michiel van Wijck, Oldenzaal (NL)

(73) Assignee: Honeywell International Inc., Morristown, NJ (US)

( * ) Notice: Subject to any disclaimer, the term of this patent is extended or adjusted under 35 U.S.C. 154(b) by 764 days.

(21) Appl. No.: 11/717,250

(22) Filed: Mar. 13, 2007

(65) Prior Publication Data
US 2008/0228321 A1 Sep. 18, 2008

(51) Int. Cl.
*G05B 19/00* (2006.01)
(52) U.S. Cl. .................................. 700/271; 700/268
(58) Field of Classification Search .................. 700/268, 700/271
See application file for complete search history.

(56) References Cited

U.S. PATENT DOCUMENTS
| | | |
|---|---|---|
| 2007/0227187 A1 | 10/2007 | Coward |
| 2007/0275471 A1 | 11/2007 | Coward |
| 2007/0276542 A1 | 11/2007 | Coward |

OTHER PUBLICATIONS

Frahm et al., Nitrogen & Methanol, Improved ammonia plant safety via advanced process control systems, No. 247, pp. 25-26 & 28-30, Sep.-Oct. 2000.*
"APC—Ammonia," Axens IFP Group Technologies, Feb. 2006, 3 pages.
"Advanced Process Control Implementation in Ammonia Plant," Honeywell, 2005, 4 pages, Oct. 21, 2009.
"Fertilizer Plant Advanced Control: Frequently Asked Questions," Honeywell, 2005, 2 pages.
"Advanced Process Control for Ammonia Plants," Uhde, 2004, 10 pages.
http://www.apc-network.com/apc/http-www.halliburton.com-kbr-relatedInfo-chemicals-K0670__1AmmoniaBrochure.pdf, 1 page.
Firmin Butoyi, U.S. Appl. No. 11/770,142, filed Jun. 28, 2007, "Multivariable Process Controller and Methodology for Controlling a Catalyzed Chemical Reaction to Form Phthalic Anhydride and Other Functionalized Aromatics."
Brian A. Coward, U.S. Appl. No. 11/811,782, filed Jun. 12, 2007, "Apparatus and Method for Optimizing a Natural Gas Liquefaction Train Having a Nitrogen Cooling Loop."
Paul S. Fountain, U.S. Appl. No. 11/708,957, filed Feb. 21, 2007, "Apparatus and Method for Optimizing a Liquefied Natural Gas Facility."
Frahm et al., Improved Ammonia Plant Safety Via Advanced Process Control Systems, Nitrogen & Methanol, British Sulphur Pub., London GB, Sep. 2000, pp. 25-27 and 29-30.
APPL, Ammonia, Ullmann's Encyclopedia of Industrial Chemistry, [online] Jun. 15, 2000, pp. 1-146, URL:http://mrw.interscience.wiley.com/emrw/9783527306732/ueic/article/a02__143/.

* cited by examiner

*Primary Examiner* — Jill Warden
*Assistant Examiner* — Dean Kwak
(74) *Attorney, Agent, or Firm* — Munck Carter, LLP

(57) ABSTRACT

An apparatus, method, and computer program for controlling an ammonia production system are provided. At least one model is associated with production equipment operable to produce ammonia, where the production equipment includes a reformer section, a carbon dioxide wash section, and an ammonia synthesis reactor section. The production equipment is controlled using the at least one model. The at least one model is associated with a plurality of controlled variables and a plurality of manipulated variables. At least some of the controlled variables are associated with the reformer section, the carbon dioxide wash section, and/or the ammonia synthesis reactor section. At least some of the manipulated variables are associated with the reformer section, the carbon dioxide wash section, and/or the ammonia synthesis reactor section.

27 Claims, 15 Drawing Sheets

|  | MV5 | MV6 | MV7 | MV8 |
|---|---|---|---|---|
| CV1 | Null Transfer Function | Null Transfer Function | Null Transfer Function | Null Transfer Function |
| CV2 | Null Transfer Function | Lap Order 2<br>Settle T = 0<br>TfSettle = 11.3<br>FIR Form = UK<br>Trial 1<br><br>$G(s) = -5.2 \frac{1}{2s^2 + s} e^{-2s}$ | Lap Order 2<br>Settle T = 0<br>TfSettle = 21.0<br>FIR Form = UK<br>Trial 1<br><br>$G(s) = -1.5 \frac{1}{3s^2 + s} e^{-7s}$ | Lap Order 2<br>Settle T = 20.0<br>TfSettle = 33.0<br>FIR Form = Pos<br>Trial 2<br><br>$G(s) = .3 \frac{1}{6s^2 + s} e^{-4s}$ |
| CV3 | Null Transfer Function | Null Transfer Function | Null Transfer Function | Null Transfer Function |
| CV4 | Null Transfer Function | Null Transfer Function | Null Transfer Function | Null Transfer Function |
| CV5 | Null Transfer Function | Null Transfer Function | Null Transfer Function | Null Transfer Function |

FIGURE 2B

|  | MV9 | DV1 | DV2 | DV3 |
|---|---|---|---|---|
| CV1 | Null Transfer Function | Null Transfer Function | Null Transfer Function | Lap Order 2<br>Settle T = 20.0<br>TfSettle = 33.0<br>FIR Form = Pos<br>Trial 2<br>$G(s) = 30 \frac{1}{6s^2 + s} e^{-4s}$ |
| CV2 | Null Transfer Function | Null Transfer Function | Null Transfer Function | Null Transfer Function |
| CV3 | Null Transfer Function | Lap Order 1<br>Settle T = 49.0<br>TfSettle = 73.5<br>FIR Form = Pos<br>Trial 4<br>$G(s) = -2 \frac{1}{18s + 1} e^{-0s}$ | Null Transfer Function | Null Transfer Function |
| CV4 | Lap Order 2<br>Settle T = 49.0<br>TfSettle = 19.3<br>FIR Form = Pos<br>Trial 4<br>$G(s) = -.998 \frac{1}{5.19s^2 + 4.56s + 1} e^{-0s}$ | Lap Order 1<br>Settle T = 49.0<br>TfSettle = 19.3<br>FIR Form = Pos<br>Trial 4<br>$G(s) = .0016 \frac{1}{4s + 1} e^{-0s}$ | Null Transfer Function | Null Transfer Function |
| CV5 | Lap Order 1<br>Settle T = 20.0<br>TfSettle = 17.0<br>FIR Form = Pos<br>Trial 2<br>$G(s) = -.06 \frac{1}{3s + 1} e^{-4s}$ | Null Transfer Function | Null Transfer Function | Null Transfer Function |

FIGURE 2C

|  | MV5 | MV6 | MV7 | MV8 |
|---|---|---|---|---|
| CV6 |  | Null Transfer Function | Null Transfer Function | Null Transfer Function |
| CV7 | Null Transfer Function | Lap Order 1<br>Settle T = 49.0<br>TfSettle = 82.3<br>FIR Form = Pos<br>Trial 4<br><br>$G(s) = .125 \dfrac{1}{20s+1} e^{-1.75s}$ | Null Transfer Function | Null Transfer Function |
| CV8 | Null Transfer Function | Lap Order 2<br>Settle T = 30.0<br>TfSettle = 25.0<br>FIR Form = Pos<br>Trial 3<br><br>$G(s) = -.1 \dfrac{1}{13.2s^2 + 7.28s + 1} e^{-2s}$ | Null Transfer Function | Null Transfer Function |
| CV9 | Null Transfer Function | Lap Order 2<br>Settle T = 10.0<br>TfSettle = 9.00<br>FIR Form = Pos<br>Trial 1<br><br>$G(s) = .0104 \dfrac{1}{1.66s^2 + 2.58s + 1} e^{-1s}$ | Null Transfer Function | Null Transfer Function |
| CV10 |  | Null Transfer Function | Null Transfer Function | Null Transfer Function |

FIGURE 2E

|  | MV5 | MV6 | MV7 | MV8 |
|---|---|---|---|---|
| CV11 | Null Transfer Function | Null Transfer Function | Null Transfer Function | Null Transfer Function |
| CV12 | Null Transfer Function | Null Transfer Function | Null Transfer Function | Null Transfer Function |
| CV13 | Null Transfer Function | Null Transfer Function | Null Transfer Function | Null Transfer Function |
| CV14 | Null Transfer Function | Lap Order 1<br>Settle T = 0<br>TfSettle = 27.6<br>FIR Form = UK<br>Trial 1<br>$G(s) = .065 \frac{1}{6s+1} e^{-3s}$ | Lap Order 1<br>Settle T = 0<br>TfSettle = 27.6<br>FIR Form = UK<br>Trial 1<br>$G(s) = .065 \frac{1}{6s+1} e^{-3s}$ | Null Transfer Function |

FIGURE 2H

|  | DV1 | DV2 | DV3 |
|---|---|---|---|
| | MV9 | | |
| CV11 | Lap Order 0<br>Settle T = 20.0<br>TfSettle = 0<br>FIR Form = Pos<br>Trial 2<br><br>G(s) = 0 | Null Transfer Function | Null Transfer Function |
| CV12 | Lap Order 0<br>Settle T = 20.0<br>TfSettle = 0<br>FIR Form = Pos<br>Trial 2<br><br>G(s) = 0 | Null Transfer Function | Null Transfer Function |
| CV13 | Lap Order 1<br>Settle T = 10.0<br>TfSettle = 16.5<br>FIR Form = Pos<br>Trial 1<br><br>$G(s) = 72 \frac{1}{4s+1} e^{-0s}$ | Null Transfer Function | Null Transfer Function |
| CV14 | Null Transfer Function | Null Transfer Function | Null Transfer Function |

FIGURE 2I

APPARATUS AND METHOD FOR CONTROLLING AN AMMONIA PRODUCTION SYSTEM

TECHNICAL FIELD

This disclosure relates generally to control systems and more specifically to an apparatus and method for controlling an ammonia production system.

BACKGROUND

An ammonia production plant typically includes a complex arrangement of equipment designed to convert natural gas into ammonia. Often times, the natural gas is used as both a raw material to produce ammonia and as a fuel for the equipment in the production plant. Ideally, the ammonia production plant is operated such that the production of ammonia is maximized while the consumption of natural gas and energy is minimized. However, conventional control systems are typically unable to meet these control and optimization objectives given the numerous constraints often associated with these objectives.

SUMMARY

This disclosure provides an apparatus and method for controlling an ammonia production system.

In a first embodiment, an apparatus includes at least one memory operable to store at least one model. The at least one model is associated with production equipment operable to produce ammonia. The production equipment includes a reformer section, a carbon dioxide wash section, and an ammonia synthesis reactor section. The apparatus also includes at least one processor operable to control the production equipment using the at least one model. The at least one model is associated with a plurality of controlled variables and a plurality of manipulated variables. At least some of the controlled variables are associated with at least one of: the reformer section, the carbon dioxide wash section, and the ammonia synthesis reactor section. At least some of the manipulated variables are associated with at least one of: the reformer section, the carbon dioxide wash section, and the ammonia synthesis reactor section.

In particular embodiments, the reformer section includes a primary reformer and a secondary reformer. Also, at least one of the controlled variables is associated with at least one of: methane slip in the secondary reformer, an air compressor that is operable to affect operation of the reformer section, and one or more heating limits of the primary reformer. In addition, at least one of the manipulated variables is associated with at least one of: a natural gas feed flow, a steam flow or steam-to-gas ratio or steam-to-hydrocarbon ratio in the primary reformer, an air flow or air-to-gas ratio in the secondary reformer, and methane slip in the primary reformer.

In other particular embodiments, at least one of the controlled variables is associated with carbon dioxide slip in the carbon dioxide wash section. Also, at least one of the manipulated variables is associated with at least one of: a flow rate of a lean solution in the carbon dioxide wash section, and a temperature of the lean solution.

In yet other particular embodiments, at least one of the controlled variables is associated with at least one of: a pressure of a synthesis reactor in the ammonia synthesis reactor section, and a synthesis gas compressor in the ammonia synthesis reactor section. Also, at least one of the manipulated variables is associated with a suction pressure of the synthesis gas compressor.

In a second embodiment, a method includes storing at least one model, where the at least one model is associated with production equipment operable to produce ammonia. The production equipment includes a reformer section, a carbon dioxide wash section, and an ammonia synthesis reactor section. The method also includes controlling the production equipment using the at least one model. The at least one model is associated with a plurality of controlled variables and a plurality of manipulated variables. At least some of the controlled variables are associated with at least one of: the reformer section, the carbon dioxide wash section, and the ammonia synthesis reactor section. At least some of the manipulated variables are associated with at least one of: the reformer section, the carbon dioxide wash section, and the ammonia synthesis reactor section.

In a third embodiment, a computer program is embodied on a computer readable medium and is operable to be executed by a processor. The computer program includes computer readable program code for storing at least one model that is associated with production equipment operable to produce ammonia. The production equipment includes a reformer section, a carbon dioxide wash section, and an ammonia synthesis reactor section. The computer program also includes computer readable program code for controlling the production equipment using the at least one model. The at least one model is associated with a plurality of controlled variables and a plurality of manipulated variables. At least some of the controlled variables are associated with at least one of: the reformer section, the carbon dioxide wash section, and the ammonia synthesis reactor section. At least some of the manipulated variables are associated with at least one of: the reformer section, the carbon dioxide wash section, and the ammonia synthesis reactor section.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 2A through 2I illustrate example models for controlling an ammonia production system;

DETAILED DESCRIPTION

Figure 1:
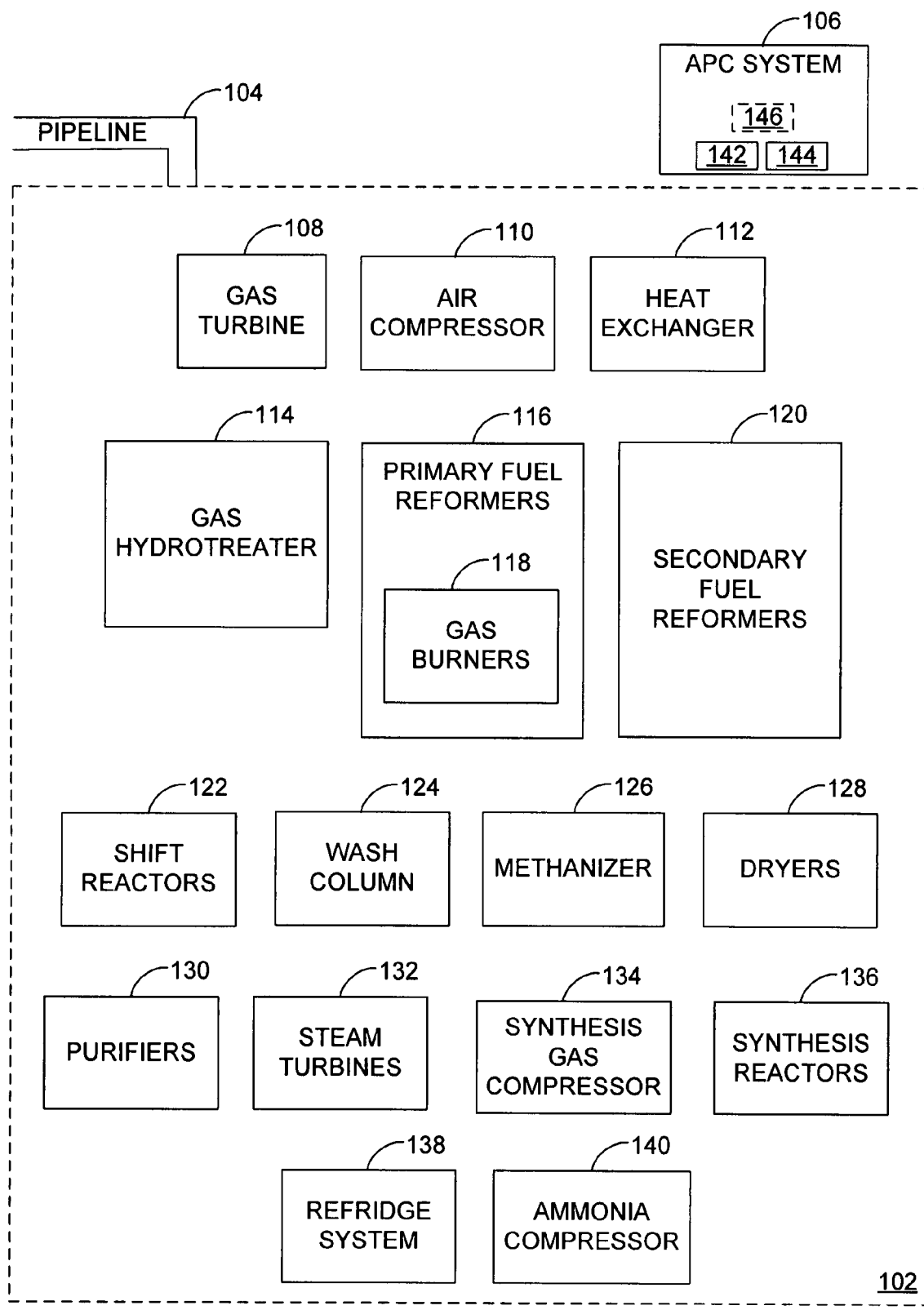
FIG. 1 illustrates an example ammonia production system.
Figure 2A:
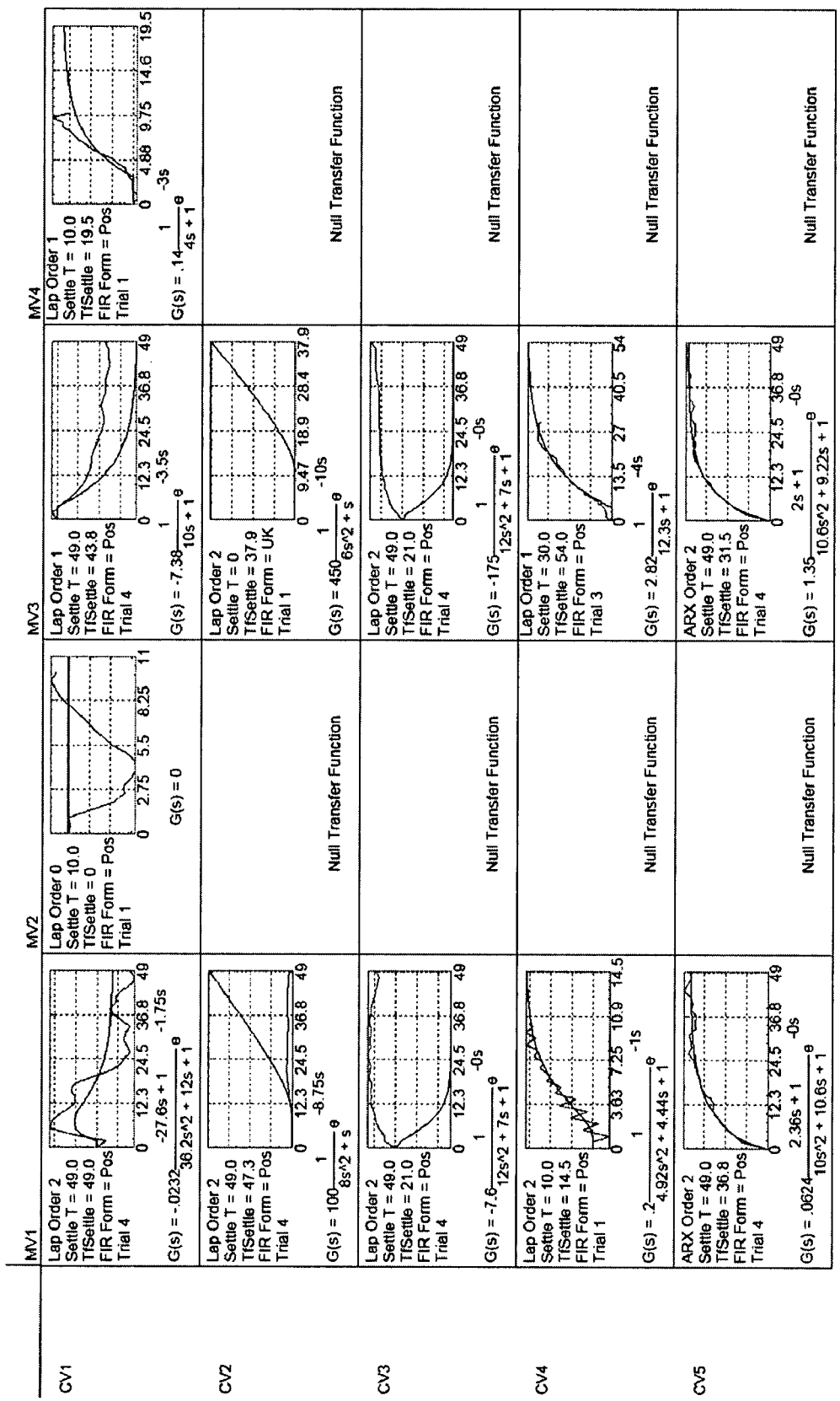
Figure 2D:
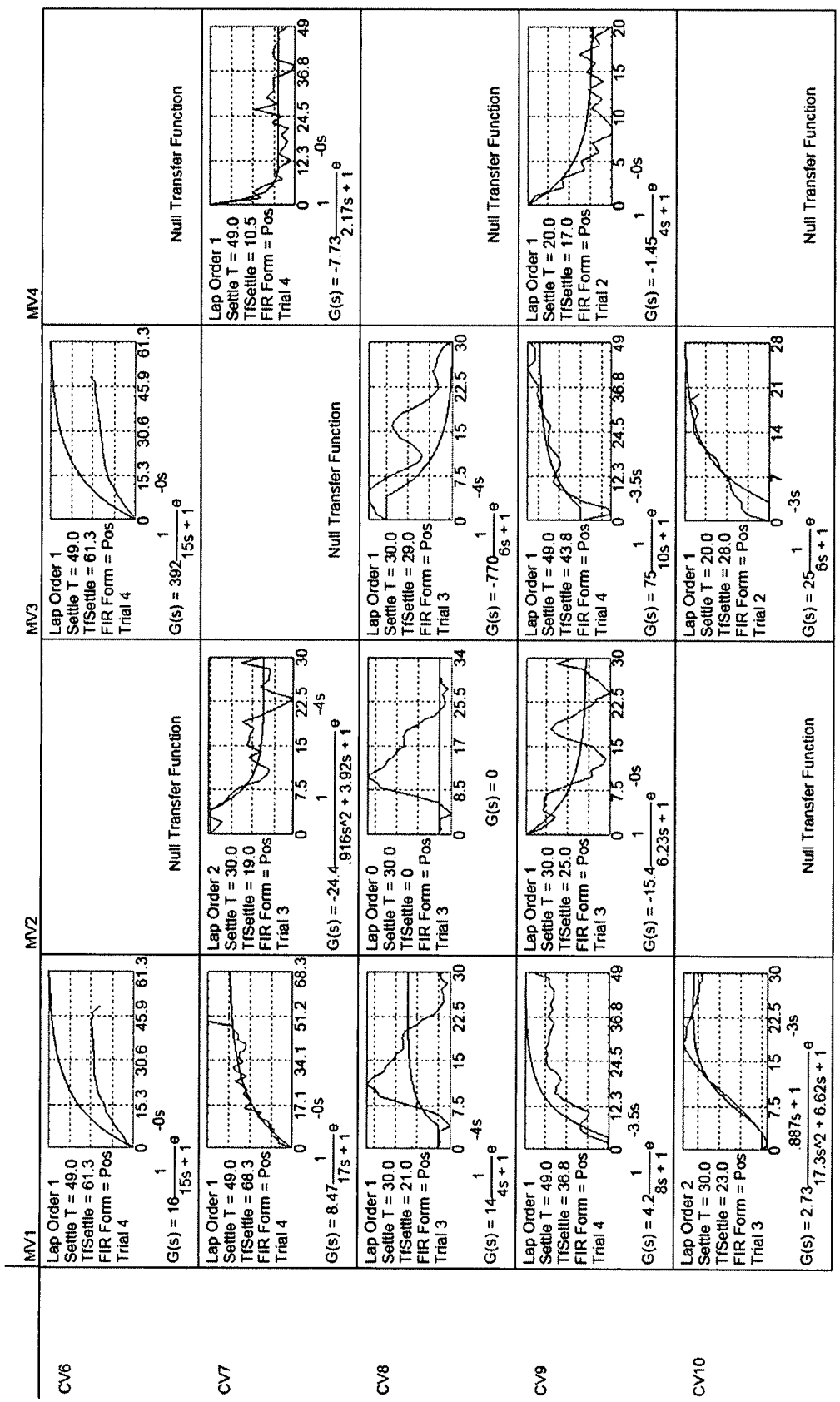
Figure 2F:
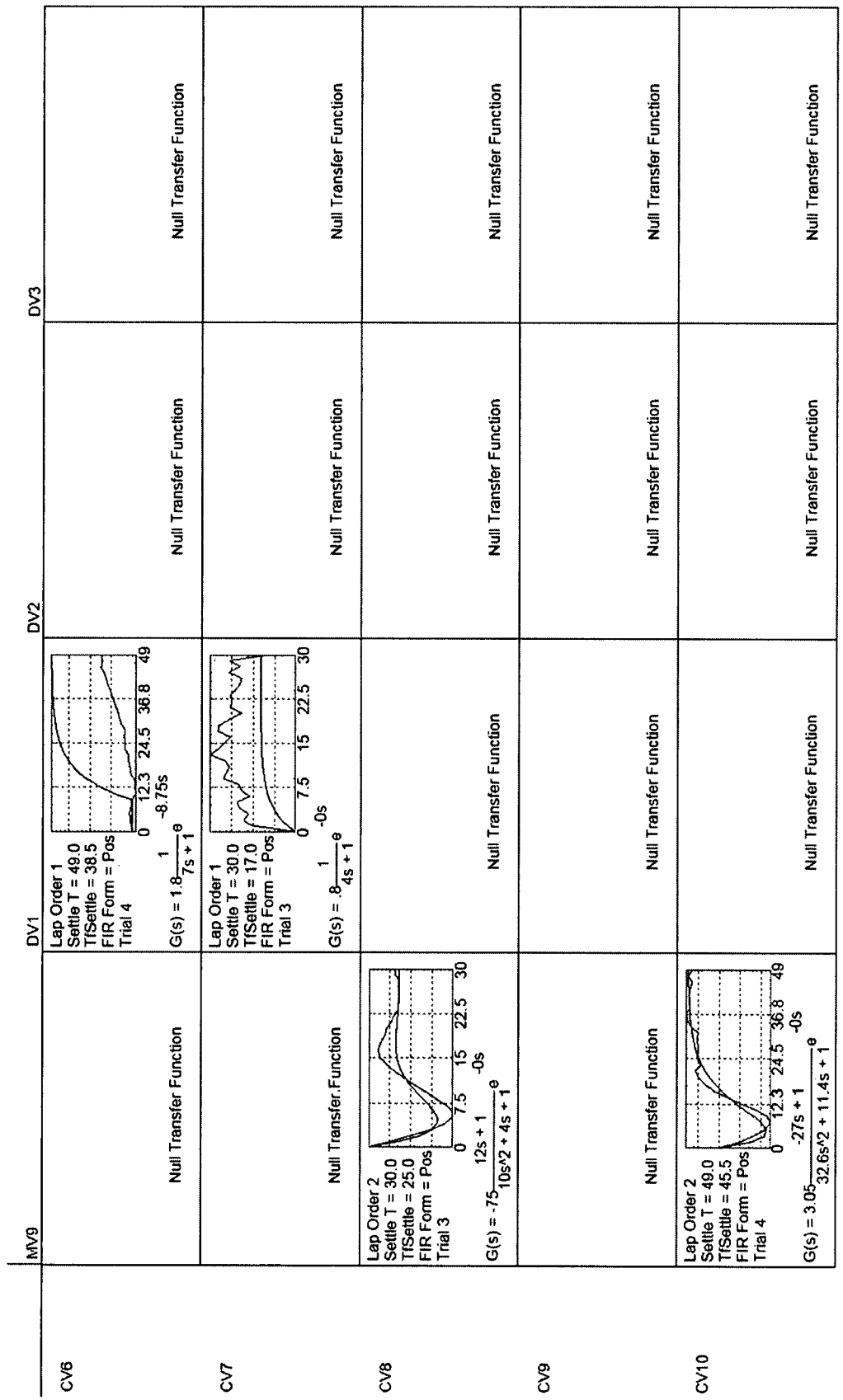
Figure 2G:
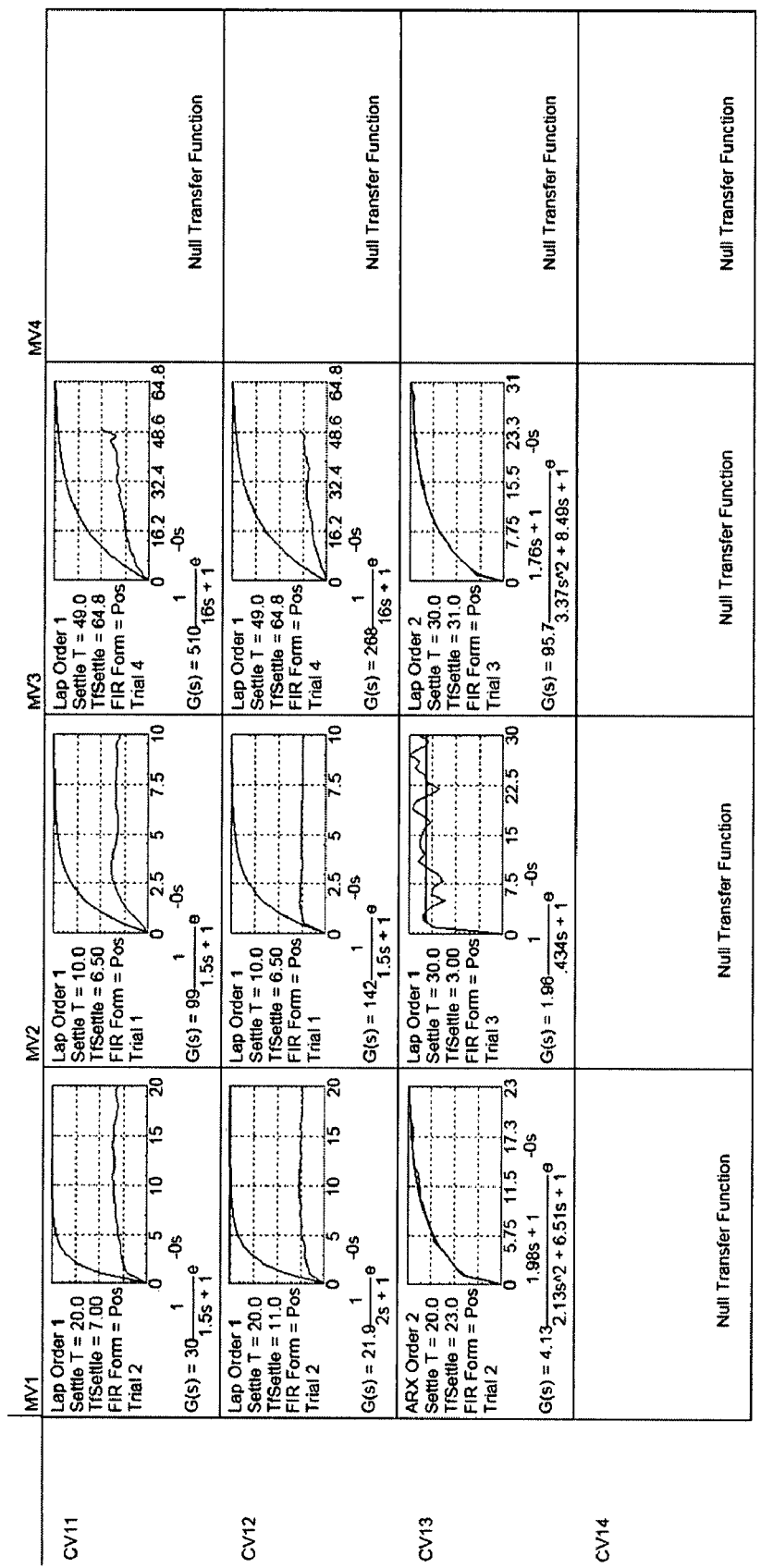

FIG. 1 illustrates an example ammonia production system 100. The embodiment of the ammonia production system 100 shown in FIG. 1 is for illustration only. Other embodiments of the ammonia production system 100 may be used without departing from the scope of this disclosure.

In this example embodiment, the ammonia production system 100 includes production equipment 102 for processing natural gas received through a pipeline 104 to produce ammonia. An advanced process control (APC) system 106 controls the production equipment 102 to increase or maximize the production of ammonia while reducing or minimizing the use of fuel or energy by the production equipment 102 (such as natural gas used as fuel by the production equipment 102).

As shown in FIG. 1, the production equipment 102 includes various components for processing natural gas to produce ammonia. The production equipment 102 (shown in simplified form) in this example embodiment represents a Braun Purifier-type ammonia production system. The following details represent a specific implementation of the production equipment 102 in the ammonia production system 100. Other embodiments of the ammonia production system 100 could be used.

Feedstocks provided to the production equipment 102 include natural gas, ambient air, and water. The natural gas enters via the pipeline 104. The composition of the natural gas may fluctuate in methane ($CH_4$) content, which can be seen as density fluctuations. The gas might normally contain approximately 98% methane, but this could drop to approximately 95% methane. The consumption of natural gas by the production equipment 102 during normal operation could be approximately 689 normal cubic meters ($Nm^3$) of natural gas per ton of ammonia produced. Among other things, the natural gas can be used as a raw material to produce the ammonia. The natural gas can also be used as a fuel for one or more gas turbines 108, which can be used to drive one or more air compressors 110. The natural gas can also be used as fuel for one or more gas burners 118 of a primary reformer 116.

In this particular embodiment, natural gas is desulphurized in a gas hydrotreater 114. The natural gas is also mixed with steam to feed the primary reformer 116. In heated catalyst tubes of the primary reformer 116, the methane reacts with water to produce carbon monoxide and hydrogen gas (the endothermic reaction $CH_4+H_2O<->CO+3H_2$). Combustion air for the burners 118 in the primary reformer 116 is hot exhaust gas from the gas turbine 108, allowing combustion heat to be recovered. Here, the gas burners 118 may include side burners that heat the catalyst tubes and an auxiliary burner used to generate heat for steam production.

The primary reformer effluent is fed to a secondary reformer 120, where it is mixed with compressed air. In a catalyst bed in the secondary reformer 120, methane reacts with oxygen gas to produce carbon monoxide and hydrogen gas (the exothermic reaction $2CH_4+O_2<->2CO+4H_2$). The air used here could be ambient air.

Water is vaporized to produce steam in one or more heat exchangers 112, which quench the secondary reformer effluent. This steam is superheated in a convection section of the primary reformer 116. More heat is recovered from the primary reformer convection by preheating process feed gas, boiler water, and air provided to the secondary reformer.

The quenched secondary reformer effluent is sent to a high temperature shift reactor and a low temperature shift reactor (generally referred to as shift reactors 122). In catalyst beds in the shift reactors 122, the carbon monoxide reacts with water to produce carbon dioxide and hydrogen gas (the reaction $CO+H_2O<->CO_2+H_2$). The carbon dioxide is removed in a carbon dioxide wash column 124, where the carbon dioxide is absorbed in an aqueous methyldiethanolamine (MDEA) solution. Since carbon dioxide is a catalyst poison for ammonia synthesis, any carbon monoxide and carbon dioxide slip from the wash column 124 is converted to methane in a methanizer 126 (according to the exothermic reactions $CO+3H_2->CH_4+H_2O$ and $CO_2+4H_2->CH_4+2H_2O$).

The water is removed in one or more dryers 128, and the resulting gas is fed to one or more purifiers 130. In the purifiers 130, most or all methane and a large part of any neon and argon traces are washed out via contact with liquid nitrogen. The purifier effluent is synthesis gas formed of nitrogen (from ambient air) and hydrogen. The ratio of nitrogen to hydrogen may be controlled by liquid nitrogen reflux in the purifier 130. The gas removed in the purifier 130 can be used as fuel gas in the primary reformer 116.

The synthesis gas is compressed by a synthesis gas compressor 134, which is driven by multiple steam turbines 132 on a single shaft. In two synthesis reactors 136, the synthesis gas is converted to ammonia in catalyst beds (according to the reaction $N_2+3H_2<->2NH_3$). The synthesis reactor ammonia effluent is cooled against boiler water, generating high pressure steam. The reactor effluent can be further cooled against process streams to recover heat, and the ammonia is condensed in an ammonia refridge system 138 driven by an ammonia compressor 140. The rest of the gas is recycled to the synthesis gas compressor 134. A small purge flow can be used to prevent and control accumulation of inert gasses such as argon. This purge gas may be sent back to the purifier feed so that no hydrogen is lost. This means that the only route out for inert gasses such as argon is via the purifier off gas to the primary reformer fuel gas. The methane content of the purifier off gas can be controlled by injecting a small flow of fresh natural gas.

The superheated high pressure steam drives the steam turbines 132, which drive the synthesis gas compressor 134. In particular embodiments, one steam turbine (denoted HD1) could reduce the steam pressure to medium pressure and control this pressure, where the medium pressure steam is used with the production equipment 102. Another steam turbine (denoted HD2) could reduce the pressure to low pressure and deliver the steam to a low pressure steam header, and this turbine could control the high pressure steam pressure. The speed of the synthesis gas compressor 134 may be controlled by a third turbine (denoted ND) on the same shaft that is fed with steam from the low pressure steam header. The third turbine's back pressure may be controlled by a steam condenser. The medium pressure steam is used as a reactant in the primary reformer 116, and surplus steam is delivered to the low pressure steam header.

As noted above, the APC system 106 may control the production equipment 102 to increase or maximize the production of ammonia while reducing or minimizing the use of fuel or energy by the production equipment 102. The APC system 106 could, for example, increase or maximize ammonia production by reducing the variability of key control parameters and setting appropriate control targets closer to their limits. This could be done with a built-in optimizer that maximizes throughput while taking into consideration the specifications for the system 100 and the specifications for the product (ammonia) being produced. The APC system 106 could reduce or minimize natural gas or energy consumption by optimizing any remaining degrees of freedom subject to certain constraints. The optimization of the remaining degrees of freedom may be done using an economic objective function that maximizes plant profit. In particular embodiments, the APC system 106 controls the primary reformer 116, secondary reformer 120, wash column 124, and synthesis reactors 136 to increase or maximize ammonia production and reduce or minimize natural gas or energy consumption.

The APC system 106 represents any hardware, software, firmware, or combination thereof for controlling the production equipment 102. The APC system 106 could, for example, include one or more processors 142 and one or more memories 144 storing data and instructions (such as models of the system 100) used or generated by the processor(s) 142. As a particular example, the APC system 106 could represent a controller implemented using Robust Multivariable Predictive Control Technology (RMPCT) supporting multivariable predictive constraint and optimization control, which could be implemented as a software package 146. The software package 146 could, for example, be executed in the WINDOWS 2000 operating system at a fifteen second frequency on a TPS APP NODE from HONEYWELL INTERNATIONAL INC. The APC system 106 could include various controllers used to control different aspects of the production equipment 102.

Additional details regarding the operations and controls provided by the APC system 106 follow. These details represent possible implementations of the APC system 106 only. They are provided simply as examples of how the APC system 106 can control the production equipment 102.

In general, the system 100 is associated with various "process variables," which represent various aspects of the system 100 (such as flow rate, pressure, or volume). The APC system 106 may operate by attempting to maintain a "controlled" process variable at or near a desired value or within a desired operating range. The APC system 106 attempts to maintain the controlled variable by altering one or more "manipulated" process variables (such as an opening of a valve or a speed of a turbine). A "disturbance" variable represents a process variable that affects a controlled variable, where the disturbance variable can be considered by the APC system 106 when altering the manipulated variables but generally cannot be controlled by the APC system 106 (such as ambient temperature). By controlling certain controlled variables, the APC system 106 may reduce the variability of the controlled variables and set the controlled variables closer to their limits, thereby increasing or maximizing ammonia production.

To reduce or minimize natural gas or energy consumption, the APC system 106 could be configured with linear program (LP) economics or quadratic program (QP) economics that maximize plant profit. These two different economic optimization approaches use a minimization strategy, and the quadratic optimization can also use ideal resting values (or desired steady state values). The general form of an objective function could be:

$$\text{Minimize } J = \sum_i b_i \times CV_i + \sum_i a_i^2 (CV_i - CV_{0i})^2 + \sum_j b_j \times MV_j + \sum_j a_j^2 (MV_j - MV_{0j})^2$$

where:
  $b_i$ represents the linear coefficient of the $i^{th}$ controlled variable;
  $b_j$ represents the linear coefficient of the $j^{th}$ manipulated variable;
  $a_i$ represents the quadratic coefficient of the $i^{th}$ controlled variable;
  $a_j$ represents the quadratic coefficient of the $j^{th}$ manipulated variable;
  $CV_i$ represents the actual resting value of the $i^{th}$ controlled variable;
  $CV_{0i}$ represents the desired resting value of the $i^{th}$ controlled variable;
  $MV_j$ represents the actual resting value of the $j^{th}$ manipulated variable; and
  $MV_{0j}$ represents the desired resting value of the $j^{th}$ manipulated variable.

As shown here, the optimization may involve a large number of process variables, each able to be incorporated into either a linear or quadratic optimization objective. The APC system 106 can optimize the controlled variables (once ammonia production is increased or maximized) using this optimization to reduce fuel/energy consumption.

These represent general approaches as to how the APC system 106 can increase or maximize ammonia production and decrease or minimize fuel/energy consumption. The following represents additional details of how these operations could be performed by the APC system 106. Again, these details describe example operations only. In the following discussion, various operations of the production equipment 102 are described, followed by an explanation as to how certain process variables can be controlled by the APC system 106.

In the convection section of the primary reformer 116, water may be sprayed into the superheated steam to control the temperature at about 450° C. A master controller may control the steam temperature, and a water injection flow controller may act as a slave. If more fuel gas is sent to the auxiliary gas burner 118 in the primary reformer 116, the steam temperature controller may inject more water to maintain the temperature, which produces more high pressure steam.

The air flow to the secondary reformer 120 may be measured and controlled by an air flow controller manipulating a gas turbine speed controller setpoint. An air/gas ratio controller can be used to send a setpoint to the air flow controller. Similarly, a steam/gas ratio controller may manipulate a steam-to-primary reformer flow controller setpoint.

In order to maximize ammonia production, the APC system 106 may support a single Robust Multivariable Predictive Control (RMPCT) strategy. The APC system 106 may solve the entire control problem simultaneously and be executed at a fifteen-second frequency.

The design of the APC system 106 can be as follows. Controlled variables used by the APC system 106 are listed in Table 1. The "Critical" column indicates the controlled variables that are set as critical in the APC system 106.

TABLE 1

| Controlled Variables | Name | Critical |
|---|---|---|
| CH$_4$ slip secondary reformer (process variable) | CV1 | |
| CO$_2$ slip treated gas (process variable) | CV2 | |
| Calculated variable: Inlet Guide Vanes gas turbine & exhaust temperature gas turbine difference (compressor limits) | CV3 | |
| Pressure safety valves (process variable) | CV4 | C |
| Delta pressure air combination (process variable) | CV5 | |
| Stack gas dampers (primary reformer heating limit) (output variable) | CV6 | C |
| HP steam quench valve positions (high select) (primary reformer heating limit) (output variable) | CV7 | |
| ND turbine valve position (synthesis gas compressor limit) | CV8 | C |
| HD2 turbine valve position (synthesis gas compressor limit) | CV9 | C |
| Synthesis reactor pressure (process variable) | CV10 | C |
| Natural gas flow controller output (output variable) | CV11 | |
| Steam flow controller output (output variable) | CV12 | |
| Air flow controller output (output variable) | CV13 | |
| CO$_2$ wash bottom level controller output (output variable) | CV14 | |

Each of these controlled variables could have validation limits, such as when each controlled variable is validated against a high value, a low value, a rate of change, and a frozen value. Table 2 shows the following for each of the controlled variables: absolute high and low limits, rate of change limit, and freeze tolerance and time. A controlled variable may be flagged as being bad if one of its limits is exceeded. Also, if a controlled variable changes less than the freeze tolerance during the freeze time window, it may represent a frozen value and be flagged as being bad.

TABLE 2

| Name | Description | High | Low | Roc/exec | Freeze tolerance | Freeze minutes |
|---|---|---|---|---|---|---|
| CV1 | $CH_4$ slip secondary reformer | 2 | 1 | 0.25 | 0.0001 | 5 |
| CV2 | $CO_2$ slip treated gas | 2000 | −1 | 2000 | — | — |
| CV3 | Inlet Guide Vanes gas turbine & exhaust temperature gas turbine difference | 100 | −1 | 5 | 0.001 | 5 |
| CV4 | Pressure safety valves | 32 | 20 | 10 | 0.0005 | 5 |
| CV5 | Delta pressure air combination | 2.5 | 0.25 | 2.5 | 0.0005 | 5 |
| CV10 | Synthesis reactor pressure | 210 | 100 | 100 | 0.0001 | 5 |
| CV8 | ND turbine valve position | 280 | 0 | 280 | 0 | 5 |
| CV9 | HD2 turbine valve position | 280 | 0 | 280 | 0 | 5 |

Here, ROC/exec refers to the rate of change per execution. To determine ROC/minute (the rate of change per minute), multiply the value in Table 2 by four (since the execution time is 15 seconds). Also, the $CO_2$ slip may have no freeze detection because it can be "frozen" at zero for long periods of time without any associated instrument malfunction.

The manipulated variables used by the APC system 106 to control these controlled variables are listed in Table 3. In this example, no manipulated variables are set as critical in the APC system 106, although various ones of the manipulated variables could be.

TABLE 3

| Manipulated Variables | Name |
|---|---|
| Natural gas feed flow rate | MV1 |
| Primary reformer Steam-to-Gas or Steam-to-Hydrocarbon (S/H) mol ratio | MV2 |
| Secondary reformer Air-to-Gas (A/G) normal volume ratio | MV3 |
| Primary reformer methane slip | MV4 |
| Fuel gas flow rate to auxiliary burners | MV5 |
| Lean solution to wash column flow rate | MV6 |
| Semi lean solution flow rate | MV7 |
| Lean solution to wash column temperature | MV8 |
| Synthesis gas compressor suction pressure | MV9 |

The process variables treated as disturbance variables by the APC system 106 during the control of the controlled variables are listed in Table 4.

TABLE 4

| Disturbance Variables | Name |
|---|---|
| Ambient Temperature | DV1 |
| Composition natural gas | DV2 |
| Lean solution PV temperature | DV3 |

The lean solution PV temperature may be representative of external disturbances, such as ambient temperature or watering coolers. The ambient temperature itself can be used for feed forward of air temperature-density effects on the gas turbine 108. It may or may not be useful to use the natural gas composition as feed forward, and this disturbance variable could be included for use if desired.

By controlling the controlled variables using these manipulated variables and disturbance variables, the APC system 106 may more effectively manage the production equipment 102, helping to increase or maximize ammonia production in the system 100. For example, the APC system 106 may use various models associating specified controlled variables to specified manipulated or disturbance variables to control the production equipment 102.

As noted above, the APC system 106 may reduce the variability of key control parameters and set appropriate control targets closer to their limits, while reducing or minimizing fuel/energy consumption by optimizing any remaining degrees of freedom subject to certain constraints. This may be done with a built-in optimizer in the APC system 106. Table 5 identifies variables that may have a linear program (LP) coefficient unequal to zero in the minimization objective function.

TABLE 5

| Variable | Name | LP Coefficicient | Objective |
|---|---|---|---|
| MV: Natural gas flow | MV1 | −20 | Maximize |
| CV: $CO_2$ slip | CV2 | 0.1 | Minimize |
| MV: Lean solution | MV6 | −0.1 | Maximize |

The $CO_2$ slip variable may have a value between two constraints (such as 150-300 ppm). Also, while shown as maximizing the natural gas flow and the lean solution, this may also result in a small energy saving. Similarly, Table 6 identifies variables that may have a quadratic program (QP) coef ficient unequal to zero in the minimization objective function and that can be optimized to example desired values.

TABLE 6

| Variable | Name | QP Coefficicient | Desired value |
|---|---|---|---|
| CV: Methane slip $2^{nd}$ reformer | CV1 | 0.1 | 1.5 |
| MV: Syn gas compressor suction pressure | MV9 | 0.01 | 22.2 |

By minimizing the objective function shown above with this information, the APC system 106 may more effectively manage the production equipment 102, helping to reduce or minimize fuel/energy consumption in the system 100.

In some embodiments, the APC system 106 may use MV1-MV4 to control CV1, CV3, CV6, and CV7. The APC system 106 may operate using the following control objectives: keep CV1 between specified limits, keep CV3 below the compressor's operating limit, and keep CV6 and CV7 below their heating limits. Once these control objectives are accomplished, the following optimization objectives can be implemented: maximize plant throughput subject to limits in all sections of the plant, maintain CV1 at an optimum target to minimize natural gas consumption, and maintain MV4 as close as possible to an optimum target to minimize natural gas consumption.

Similarly, the APC system 106 may use MV6 and optionally MV8 to control CV2. The APC system 106 may operate using the following control objective: keep CV2 below its maximum limit. Once this control objective is accomplished, the following optimization objectives can be implemented: minimize CV2 to a low limit, and minimize MV6 subject to CV2 limit to save energy.

In addition, the APC system 106 may use MV9 to control CV8-CV10. The APC system 106 may operate using the following control objectives: keep CV10 below its maximum limit, and keep CV8 and CV9 below their operating limits. Once these control objectives are accomplished, the following optimization objective can be implemented: maintain MV9 as close as possible to an optimum target.

As noted above, calculated variables can be used during the control of the production equipment 102. For example, the value of CV3 could be calculated as follows:

$CV3 = -2.1*$Gas turbine inlet guide vane position+Gas turbine exhaust temperature difference+172.3.

Using the controlled, manipulated, and disturbance variables defined above in the various tables, models can be constructed of the ammonia production system 100. These models could be generated, for example, using step-test data involving various production equipment 102. Table 7 identifies example model relationships between various ones of the controlled, manipulated, and disturbance variables. In Table 7, a "+" entry indicates a positive gain, a "−" entry indicates a negative gain, and a blank entry indicates no model (no relationship) is used.

TABLE 7

| CV | MV/DV | | | | | | | | | | | |
|---|---|---|---|---|---|---|---|---|---|---|---|---|
|  | MV1 | MV2 | MV3 | MV4 | MV5 | MV6 | MV7 | MV8 | MV9 | DV1 | DV2 | DV3 |
| CV1 | − |  | − | + |  |  |  |  |  |  |  |  |
| CV2 | + |  | + |  |  | − | − | + |  |  |  | + |
| CV3 | − |  | − |  |  |  |  |  |  | − |  |  |
| CV4 | + |  | + |  |  |  |  | + |  |  |  |  |
| CV5 | + |  | + |  |  |  |  | − | + |  |  |  |
| CV6 | + |  | + |  |  |  |  |  | + |  |  |  |
| CV7 | + | − |  | − | + |  |  |  | + |  |  |  |
| CV8 | + |  | − |  | − |  |  |  | − |  |  |  |
| CV9 | + | − | + | − | + |  |  |  |  |  |  |  |
| CV10 | + |  | + |  |  |  |  |  | + |  |  |  |
| CV11 | + | + | + |  |  |  |  |  |  |  |  |  |
| CV12 | + | + | + |  |  |  |  |  |  |  |  |  |
| CV13 | + | + | + |  |  |  |  |  |  | + |  |  |
| CV14 |  |  |  |  |  | + | + |  |  |  |  |  |

Actual models defining example relationships between various ones of the controlled, manipulated, and disturbance variables are shown in FIGS. 2A through 2I. In these figures, blank entries represent null transfer functions, meaning no model is used in the APC system 106. Using the models shown in FIGS. 2A through 2I, the APC system 106 can effectively increase or maximize ammonia production while reducing or decreasing fuel/energy consumption. For example, the models shown in FIGS. 2A through 2I may allow the APC system 106 to determine how to make adjustments to the manipulated variables to help the controlled variables reach desired operating values or ranges while reducing variability and setting the controlled variables' targets closer to their limits.

FIGS. 3A through 3I illustrate an example user interface 300 that can be used or supported by the APC system 106. The user interface 300 may, for example, allow a user to tune the APC system 106 or perform various other functions. In this example, the user interface 300 includes control buttons 302, which allow the user to invoke various high-level functions related to the APC system 106. In this example, the control buttons 302 allow the user to place the APC system 106 in an on, off, or warm state. The control buttons 302 also allow the user to view an application menu, set various high-level options, and view status messages or reports.

Figure 3A:
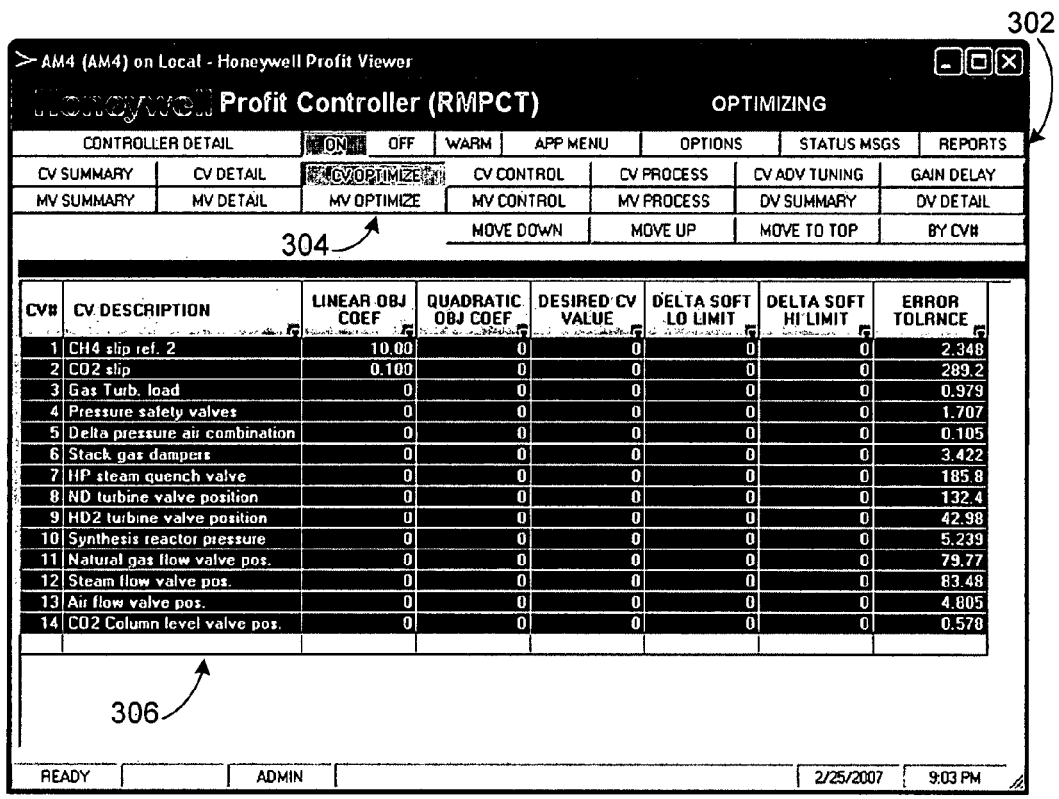
FIGS. 3A through 3I illustrate an example user interface for controlling an ammonia production system.

When the APC system 106 is activated using the appropriate control button 302, function buttons 304 can be used to invoke particular functions by the user or to display particular information to the user. The information could, for example, be displayed in a display area 306 of the user interface 300. As shown in FIG. 3A, selection of the "CV Optimize" button 304 allows the user to view and configure the optimizer as it relates to the controlled variables. For each controlled variable, the display area 306 includes a numerical index and a tag name. The display area 306 also includes LP and QP coefficient values and a desired QP coefficient value, which can be used to set the appropriate economic objectives for the controlled variable. The display area 306 further includes delta soft low and high values representing optimization soft limits and an error tolerance representing how far the controlled variable can exceed its soft limits to permit optimization. The user can review the data associated with the controlled variables and make modifications to this data as desired.

Figure 3B:
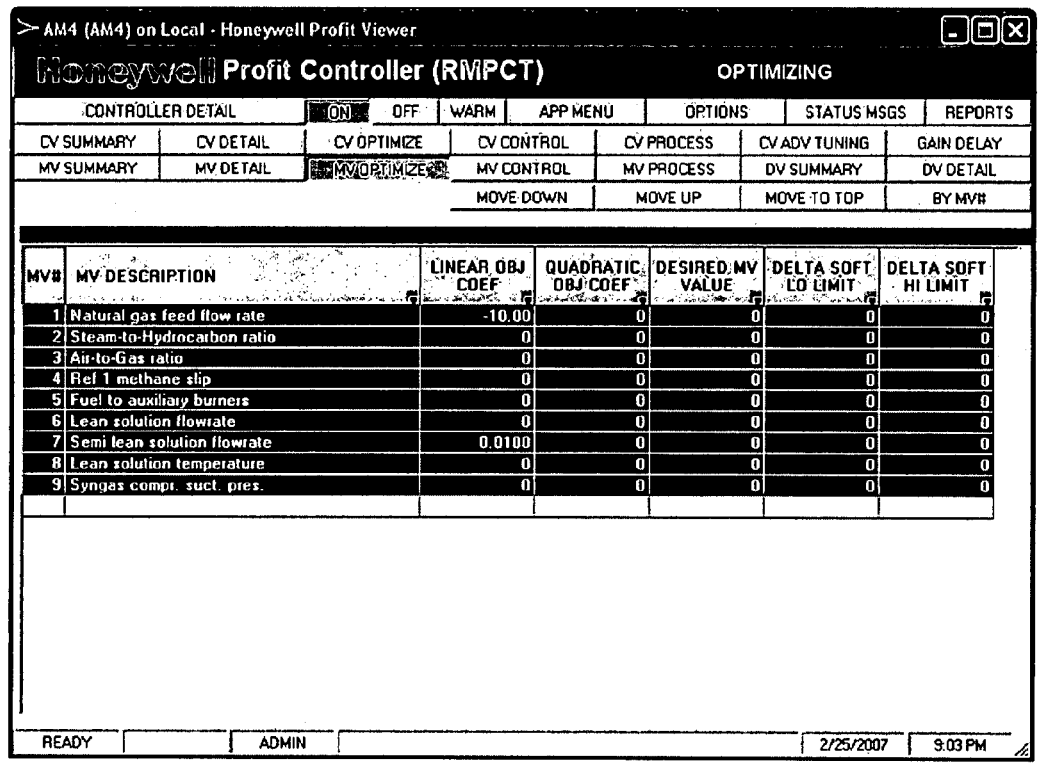

As shown in FIG. 3B, selection of the "MV Optimize" button 304 allows the user to view and configure the optimizer as it relates to the manipulated variables. For each manipulated variable, the display area 306 includes a numerical index, a tag name, LP and QP coefficient values, a desired QP coefficient value, and delta soft low and high values. The user can review the data associated with the manipulated variables and make modifications to this data as desired.

Figure 3C:
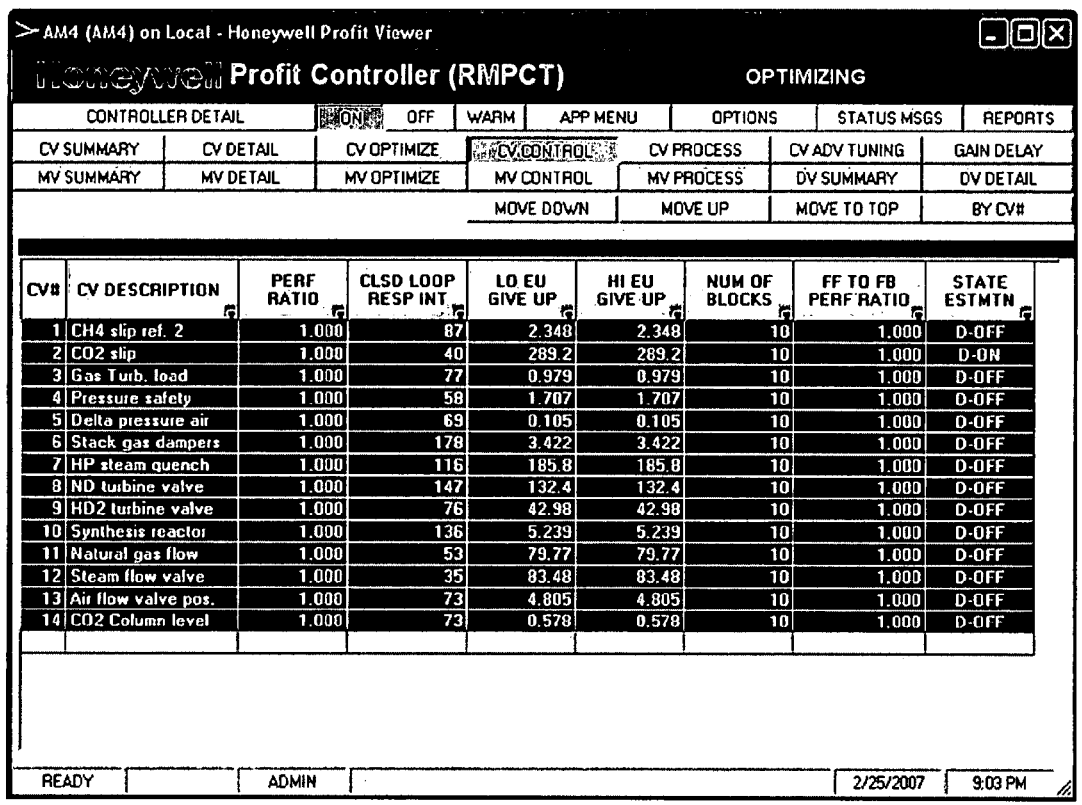

As shown in FIG. 3C, selection of the "CV Control" button 304 allows the user to view and make tuning changes for controlling the controlled variables. For each controlled variable, the display area 306 includes a numerical index and a tag name. A performance ratio identifies how hard the controller pushes the controlled variable back to its setpoint or away from a limit violation. A closed loop response interval identifies the response time for pushing the controlled variable back to its setpoint or away from a limit violation. Low and high "EU Give Up" values identify a priority of the controlled variable, which can be used when the APC system 106 is unable to keep all controlled variables at their setpoints or away from their limits. A number of blocks identifies the number of times that the APC system 106 makes a prediction for the controlled variable during the closed loop response interval. A feed forward (FF) to feedback (FB) performance ratio identifies how aggressively the APC system 106 rejects disturbance variable disturbances. A state estimation is used to control the correction of bias and ramp rates.

Figure 3D:
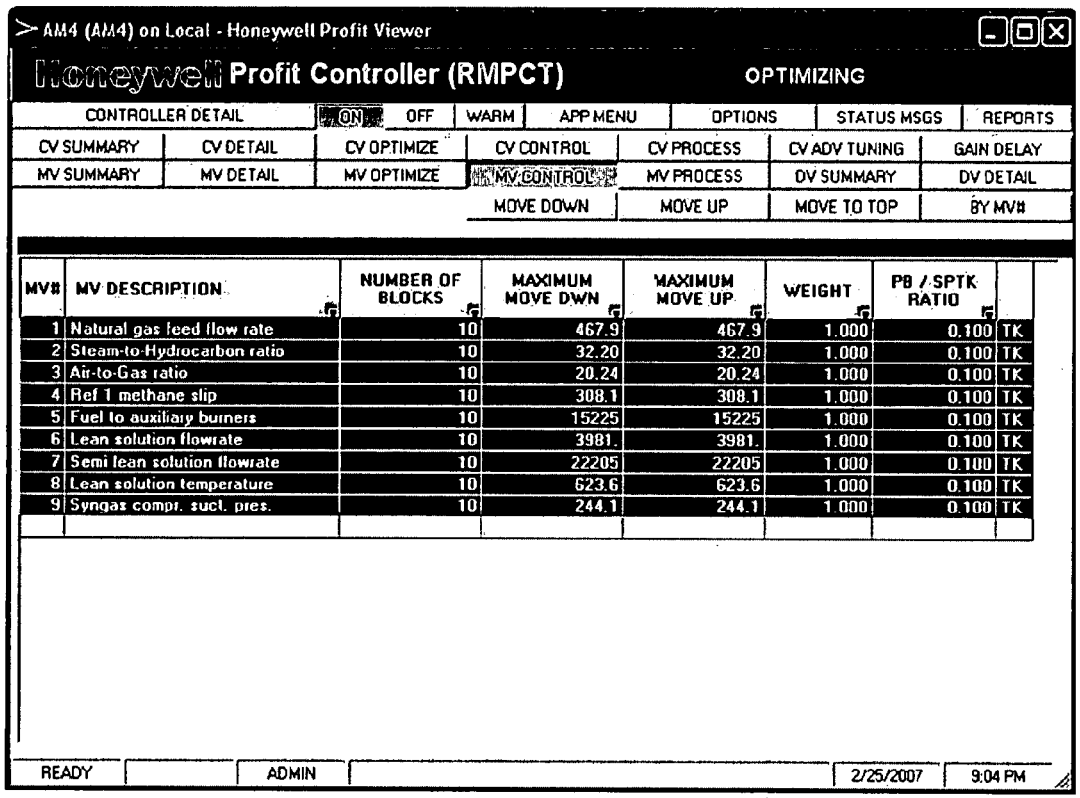

As shown in FIG. 3D, selection of the "MV Control" button 304 allows the user to view and make tuning changes for controlling the manipulated variables. For each manipulated variable, the display area 306 includes a numerical index and a tag name. A number of blocks identifies the number of times that the APC system 106 computes movements for the manipulated variable during a period of time. Maximum move down and move up values represent the largest changes that can be made to the manipulated variable at each execution. A weight represents a penalty associated with moving one manipulated variable relative to other manipulated variables. A predict back (PB) or setpoint tracking (SPTR) ratio identifies how fast the APC system 106 adjusts a setpoint to address manipulated variable windup.

Figure 3E:
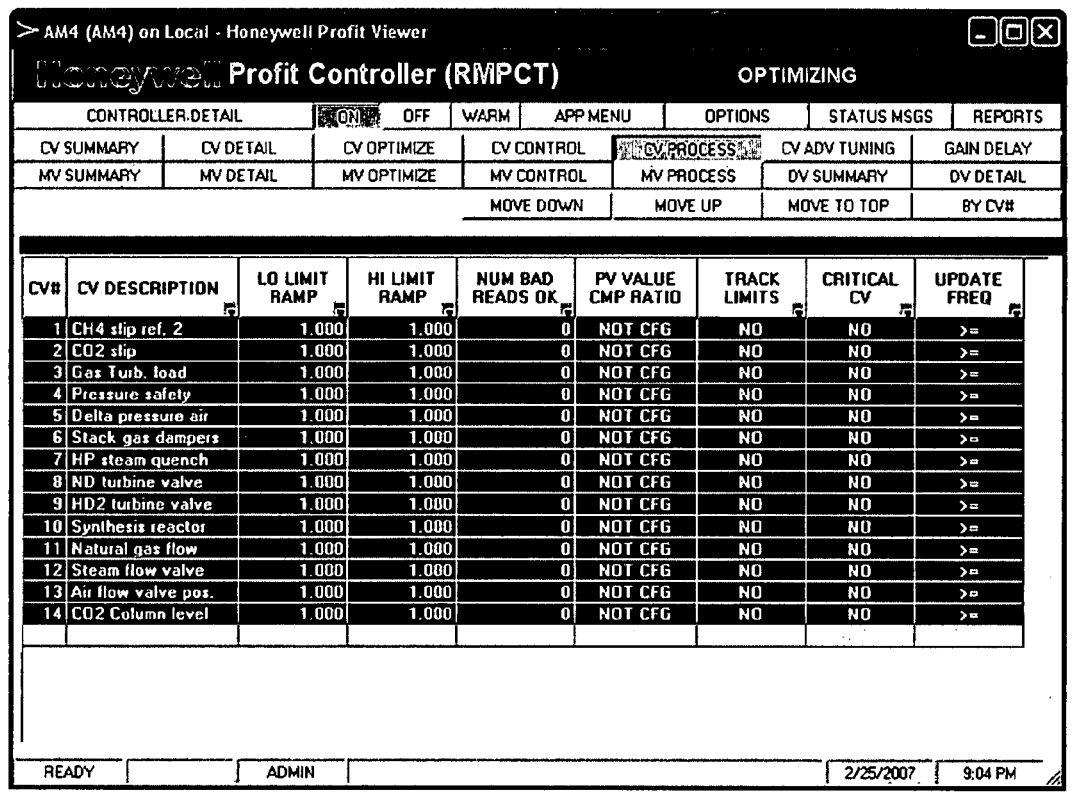

As shown in FIG. 3E, selection of the "CV Process" button 304 allows the user to view and make changes to the controlled variables. For each controlled variable, the display area 306 includes a numerical index, a tag name, and low and high ramp limits that control how fast active limits ramp or change to meet new values. A number of bad reads value identifies the number of bad values that is acceptable for a controlled variable. A PV value compensation ratio identifies the amount of a corrective signal that can be subtracted from an input signal, which is useful in cases where a controlled variable naturally oscillates. A track limits value can be used to prevent the APC system 106 from making changes to manipulated variables when the controlled variable is being initialized. A critical value indicates whether the controlled variable is critical, and an update frequency indicates whether the controlled variable is updated at least once per execution.

Figure 3F:
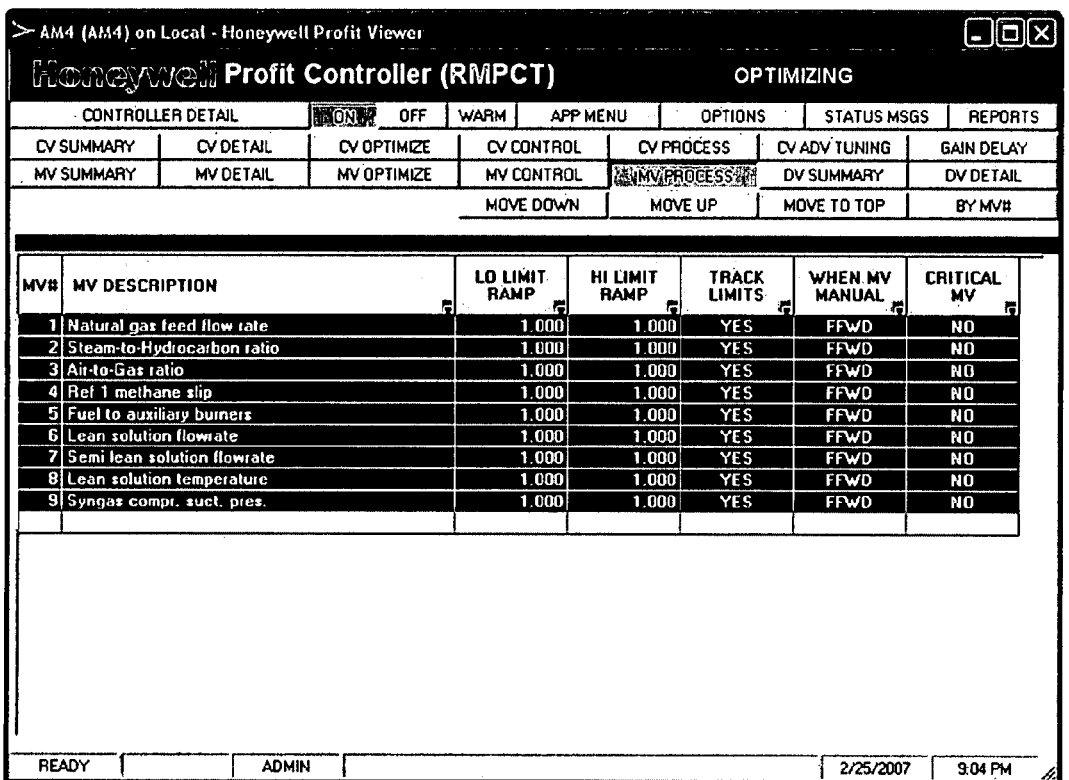

As shown in FIG. 3F, selection of the "MV Process" button 304 allows the user to view and make changes to the manipulated variables. For each manipulated variable, the display area 306 includes a numerical index, a tag name, low and high ramp limits, and a critical value. A track limits value controls whether the APC system 106 attempts to move the manipulated variable when it is outside its limits during initialization. A manual value indicates whether the manipulated variable is dropped or used as a feed forward value when the manipulated variable is not available for control.

Figure 3G:
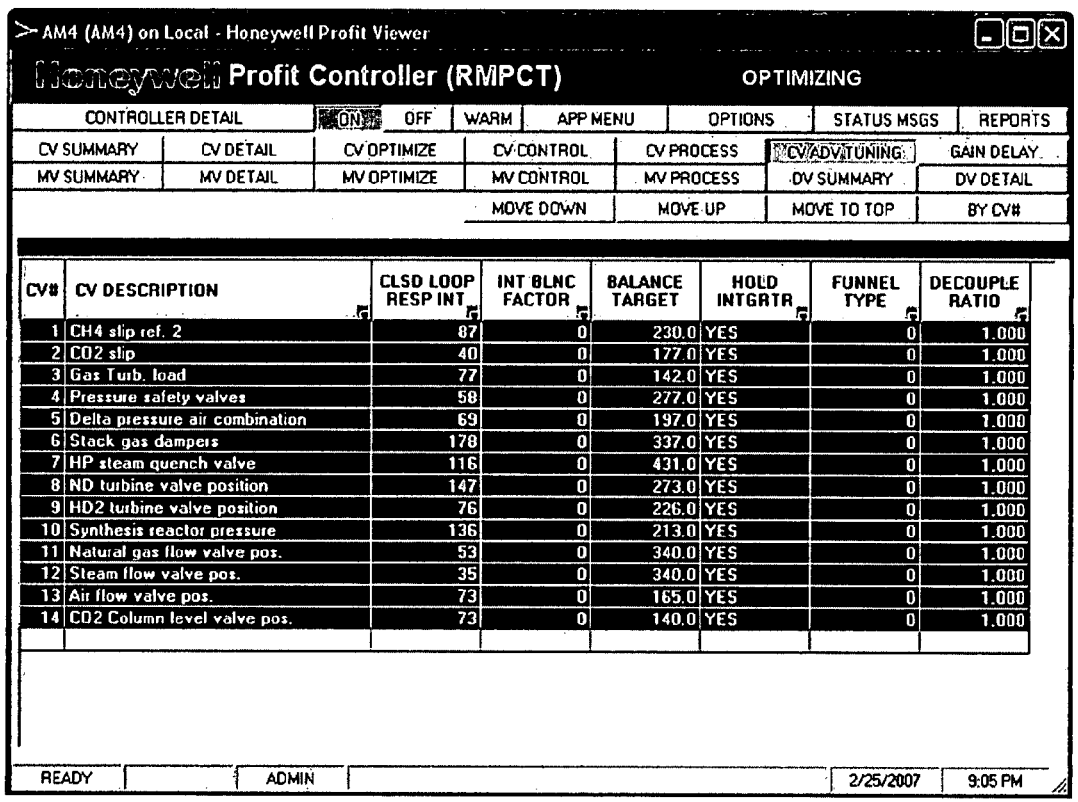

As shown in FIG. 3G, selection of the "CV Advanced Tuning" button 304 allows the user to view and make advanced tuning changes for controlling the controlled variables. For each controlled variable, the display area 306 includes a numerical index, a tag name, and a closed loop response interval. If a controlled variable involves the use of an integrator, an integrator balance factor can be specified, and a hold integrator value sets the behavior when an infeasibility occurs. A balance target identifies the steady-state horizon for optimization in intervals. A funnel type identifies a funnel shape for controlling dynamic excursions, and a decouple ratio value can be used in conjunction with certain funnel type(s).

Figure 3H:
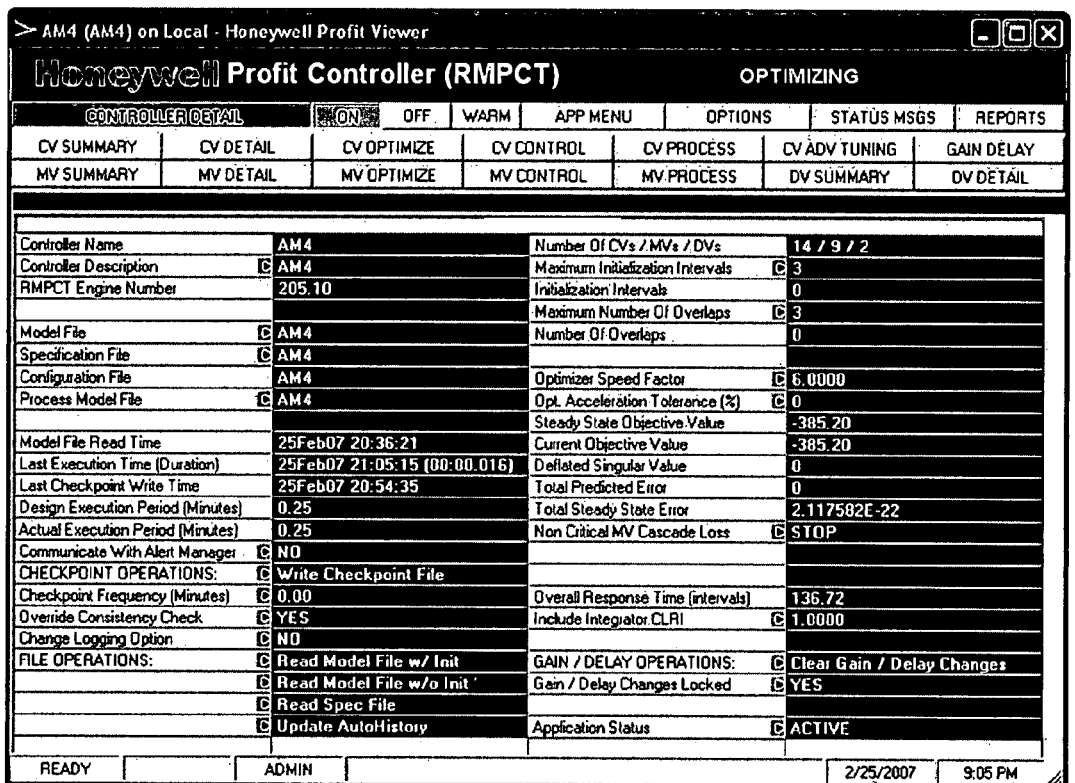

As shown in FIG. 3H, selection of the "Controller Detail" button 302 presents general information about the APC system 106 (the controller) to the user. This can include information associated with the models used by the APC system 106 to control the production equipment 102. It can also include high-level information about variables associated with the model and the current performance of the controller.

Figures 3I, 4:
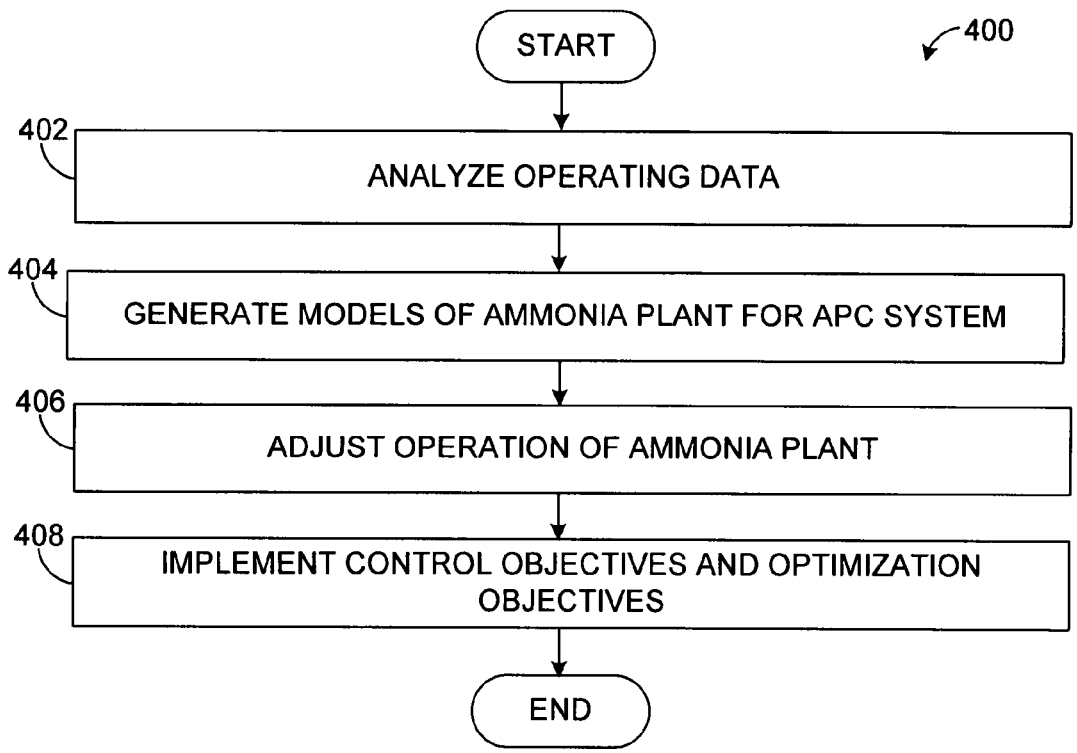
FIG. 4 illustrates an example method for controlling an ammonia production system.

As shown in FIG. 3I, a toolkit can be provided to support the RMPCT functionality described above. The RMPCT toolkit could, for example, be implemented and configured on the same APP NODE with PROFIT CONTROLLER software from HONEYWELL INTERNATIONAL INC. The toolkit may contain various functions, such as functions used for controlled variable validation purposes as described above with respect to Table 2. The ROC/exec, freeze tolerance, and freeze minutes could be configured here. These functions are denoted ASynCV01 through ASynCV10 (asynchronous controlled variable validation) in this example.

Other functions supported by the toolkit could include functions for automating actions related to manipulated variables being dropped or used as a feed forward value (when the manipulated variables are not available for control as described above). These functions are denoted FF_OFF_MAN1 through FF_OFF_MAN9 in this example. Some specific examples of these functions are as follows. Assume the APC system 106 is on with some manipulated variables set to OPR (manual mode of operation) and a status set to FFWD (feed forward), and downstream controllers for these manipulated variables are in AUTO (automatic) mode.

If an operator changes the mode of a downstream controller (for a particular manipulated variable) from automatic to manual, the toolkit sets the feed forward flag of that particular manipulated variable to off. This means the controller does not use this manipulated variable (the manipulated variable has a status of SERV, meaning communication has been lost).

If an operator takes the downstream controller (for a particular manipulated variable) back in automatic mode from manual mode, the feed forward flag of that manipulated variable is set to on, and the controller uses this manipulated variable (its status is FFWD).

For the manipulated variables that implement a ratio controller (such as MV2 & MV3), the reasoning above holds if either of the two underlying downstream controllers belonging to the same manipulated variable is taken from automatic mode to manual mode and vice-versa.

Alternative to the above, the default behaviour may be to have the status equal FFWD for the manipulated variables regardless of whether the downstream controller is in automatic or manual mode.

Additional operations can also occur in the APC system 106. For example, if the mode of a downstream controller for a manipulated variable is changed from cascade to automatic, the APC system 106 may shut itself off as a default behaviour. Also, the APC system 106 may send messages both to an LCN message summary and journal, as well as to an RMPCT journal summary. In addition, administrative rights can be enforced in the APC system 106, such as when only "administrators" can change rights or access the "Options" button 302. Example access rights can be defined as follows for operators and engineers:

| | |
|---|---|
| RMPCT WARM BUTTON FOR SS INITIALIZATION | OPER1 |
| CV AND MV OPERATOR LIMIT RAMP RATES | ENGR |
| CV AND MV DESIRED OPT TARGET VALUES | ENGR |
| MV FEED FORWARD/SERVICE SWITCH | ENGR |
| CV ENGINEERING HIGH/LOW HARD LIMITS | ENGR |
| MV ENGINEERING HIGH/LOW HARD LIMITS | ENGR. |

In particular embodiments, the APC system 106 can be implemented using PROFIT CONTROLLER from HONEYWELL INTERNATIONAL INC. on an APP NODE running WINDOWS 2000. For displaying APC information, PROFIT VIEWER can be used on GUS STATIONS in a control room, or standard PROFIT CONTROLLER native window displays can be used. PROFIT VIEWER can also be used on a standard computing device made part of the appropriate TPS domain. Computers with PROFIT VIEWER installed can communicate with the APP NODE using OPC.

Although FIG. 1 illustrates one example of an ammonia production system 100, various changes could be made to FIG. 1. For example, other or additional production equipment 102 could be used in any suitable configuration or arrangement to produce ammonia. Although FIGS. 2A through 2I illustrate examples of models for controlling an ammonia production system, any other or additional models could be used to control the production equipment in the ammonia production system 100 or another system. Although FIGS. 3A through 3I illustrate an example of a user interface for controlling an ammonia production system, any other or additional user interface could be used. Also, the arrangement and content of the user interface 300 shown in FIGS. 3A through 3I is for illustration only.

FIG. 4 illustrates an example method 400 for controlling an ammonia production system. The embodiment of the method 400 shown in FIG. 4 is for illustration only. Other embodiments of the method 400 could be used without departing from the scope of this disclosure. Also, for ease of explanation, the method 400 is described with respect to the APC system 106 controlling the ammonia production system 100. The method 400 could be used by any device or system to control any suitable ammonia production system.

Operating data for the ammonia plant is analyzed at step 402. This could include, for example, the APC system 106 receiving data identifying how certain controlled, manipulated, and disturbance variables are behaving during normal operation of the ammonia production system 100. This could also include the APC system 106 receiving step-testing data associated with testing of the ammonia production system 100. The data could be stored in a database or other repository.

Models of an ammonia plant are generated at step 404. This could include, for example, making adjustments to prior models based on the data collected at step 402. This could also include generating new models based on the data collected at step 402.

Adjustments to the operation of the ammonia plant are made at step 406. This could include, for example, the APC system 106 adjusting the production equipment 102 using the new models. As particular examples, models could be used to control CV1, CV3, CV6, and CV7 using MV1-MV4, to control CV2 using MV6 and optionally MV8, and to control CV8-CV10 using MV9.

One or more control objectives and optimization objectives are implemented at step 408. This could include, for example, controlling the specified CVs using the specified MVs while taking into account both certain control objectives and optimization objectives. Among other things, these objectives may help to increase ammonia production in the ammonia production system 100 while reducing fuel/energy consumption in the ammonia production system 100.

Although FIG. 4 illustrates one example of a method 400 for controlling an ammonia production system, various changes may be made to FIG. 4. For example, while shown as a series of steps, various steps in FIG. 4 could overlap. Also, various steps in FIG. 4 could be repeated, such as when steps 406-408 are routinely performed and steps 402-404 are repeated at a much longer interval. In addition, steps 402-404 could be performed by one device to generate or modify models of the system 100, and steps 406-408 could be performed by another device (such as a controller) using the models of the system 100.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   at least one memory encoding computer readable program code for controlling production equipment and at least one model, the at least one model associated with the production equipment that is operable to produce ammonia, the production equipment comprising a reformer section, a carbon dioxide wash section, and an ammonia synthesis reactor section, the reformer section comprising a primary reformer and a secondary reformer; and
   at least one processor that executes the computer readable program code in order to cause the at least one processor to control the production equipment using the at least one model;
   wherein the at least one model represents a plurality of controlled variables and a plurality of manipulated variables, at least one manipulated variable being associated with at least one controlled variable through the at least one model, and
   wherein the at least one processor is configured to manipulate the at least one manipulated variable to control the at least one associated controlled variable using the at least one model;
   wherein the controlled variables comprise at least one of: a methane slip in the secondary reformer, an exhaust temperature of an air compressor, a heating limit of a stack gas damper in the primary reformer, a carbon dioxide slip in the carbon dioxide wash section, a pressure of an ammonia synthesis reactor, and a valve position in an ammonia synthesis gas compressor; and
   wherein the manipulated variables comprise at least one of: a steam flow or steam ratio in the primary reformer, an air-to-gas ratio in the secondary reformer, a temperature of a lean solution in the carbon dioxide wash section, and a suction pressure of the ammonia synthesis gas compressor.

2. The apparatus of claim 1, wherein:
   the steam ratio in the primary reformer is one of: a steam-to-gas ratio and a steam-to-hydrocarbon ratio;
   the controlled variables comprise at least one of: the methane slip in the secondary reformer, the exhaust temperature of the air compressor, and the heating limit of the stack gas damper in the primary reformer; and the manipulated variables comprise at least one of: the steam flow or the steam-to-gas ratio or the steam-to-hydrocarbon ratio in the primary reformer and the air-to-gas ratio in the secondary reformer.

3. The apparatus of claim 2, wherein the at least one processor is configured to manipulate at least one of the manipulated variables in order to at least one of:
   maintain the methane slip in the secondary reformer between specified limits;
   maintain the exhaust temperature of the air compressor below an operating limit; and
   maintain the stack gas damper in the primary reformer below the heating limit.

4. The apparatus of claim 3, wherein the at least one processor is configured to manipulate at least one of the manipulated variables in order to at least one of:
   maximize throughput of the production equipment;
   maintain the methane slip in the secondary reformer at or near an optimum target to minimize natural gas consumption; and
   maintain the methane slip in the primary reformer at or near an optimum target to minimize natural gas consumption.

5. The apparatus of claim 1, wherein:
   the controlled variables comprise the carbon dioxide slip in the carbon dioxide wash section; and
   the manipulated variables comprise the temperature of the lean solution in the carbon dioxide wash.

6. The apparatus of claim 5, wherein the at least one processor is configured to manipulate at least one of the manipulated variables in order to maintain the carbon dioxide slip in the carbon dioxide wash section below a maximum limit.

7. The apparatus of claim 6, wherein the at least one processor is configured to manipulate at least one of the manipulated variables in order to minimize the carbon dioxide slip in the carbon dioxide wash section to a low limit.

8. The apparatus of claim 1, wherein:
   the controlled variables comprise at least one of: the pressure of the ammonia synthesis reactor and the valve position in the ammonia synthesis gas compressor; and
   the manipulated variables comprise the suction pressure of the ammonia synthesis gas compressor.

9. The apparatus of claim 8, wherein the at least one processor is configured to manipulate at least one of the manipulated variables in order to maintain the ammonia synthesis gas compressor below an operating limit.

10. The apparatus of claim 9, wherein the at least one processor is configured to manipulate at least one of the manipulated variables in order to maintain the suction pressure of the ammonia synthesis gas compressor at or near an optimum target.

11. The apparatus of claim 8, wherein the at least one processor is configured to manipulate at least one of the manipulated variables in order to maintain the pressure of the ammonia synthesis reactor below a maximum limit.

12. A method comprising:
   retrieving at least one model from a memory, the at least one model associated with production equipment operable to produce ammonia, the production equipment comprising a reformer section, a carbon dioxide wash section, and an ammonia synthesis reactor section, the reformer section comprising a primary reformer and a secondary reformer; and
   controlling the production equipment using the at least one model;
   wherein the at least one model represents a plurality of controlled variables and a plurality of manipulated variables, at least one manipulated variable being associated with at least one controlled variable through the at least one model, and wherein controlling the production equipment comprises manipulating the at least one manipulated variable to control the at least one associated controlled variable using the at least one model;
   wherein the controlled variables comprise at least one of: a methane slip in the secondary reformer, an exhaust temperature of an air compressor, a heating limit of a stack gas damper in the primary reformer, a carbon dioxide slip in the carbon dioxide wash section, a pressure of an ammonia synthesis reactor, and a valve position in an ammonia synthesis gas compressor; and wherein the manipulated variables comprise at least one of: a steam flow or steam ratio in the primary reformer, an air-to-gas ratio in the secondary reformer, a temperature of a lean solution in the carbon dioxide wash, and a suction pressure of the ammonia synthesis gas compressor.

13. The method of claim 12, wherein:

the steam ratio in the primary reformer is one of: a steam-to-gas ratio and a steam-to-hydrocarbon ratio;

the controlled variables comprise at least one of: the methane slip in the secondary reformer, the exhaust temperature of the air compressor, and the heating limit of the stack gas damper in the primary reformer; and the manipulated variables comprise at least one of: the steam flow or the steam-to-gas ratio or the steam-to-hydrocarbon ratio in the primary reformer and the air-to-gas ratio in the secondary reformer.

14. The method of claim 13, further comprising manipulating at least one of the manipulated variables in order to at least one of:

maintain the methane slip in the secondary reformer between specified limits;

maintain the exhaust temperature of the air compressor below an operating limit; and maintain the stack gas damper in the primary reformer below the heating limit.

15. The method of claim 14, further comprising manipulating at least one of the manipulated variables in order to at least one of:

maximize throughput of the production equipment;

maintain the methane slip in the secondary reformer at or near an optimum target to minimize natural gas consumption; and maintain the methane slip in the primary reformer at or near an optimum target to minimize natural gas consumption.

16. The method of claim 12, wherein:

the controlled variables comprise the carbon dioxide slip in the carbon dioxide wash section; and the manipulated variables comprise the temperature of the lean solution in the carbon dioxide wash.

17. The method of claim 16, further comprising manipulating at least one of the manipulated variables in order to maintain the carbon dioxide slip in the carbon dioxide wash section below a maximum limit.

18. The method of claim 17, further comprising manipulating at least one of the manipulated variables in order to minimize the carbon dioxide slip in the carbon dioxide wash section to a low limit.

19. The method of claim 12, wherein:

the controlled variables comprise at least one of: the pressure of the ammonia synthesis reactor and the valve position in the ammonia synthesis gas compressor; and the manipulated variables comprise the suction pressure of the ammonia synthesis gas compressor.

20. The method of claim 19, further comprising manipulating at least one of the manipulated variables in order to maintain the ammonia synthesis gas compressor below an operating limit.

21. The method of claim 20, further comprising manipulating at least one of the manipulated variables in order to maintain the suction pressure of the ammonia synthesis gas compressor at or near an optimum target.

22. The method of claim 12, further comprising generating the at least one model.

23. A non-transitory computer readable medium encoded with a computer program, the computer program comprising computer readable program code for:

obtaining at least one model, the at least one model associated with production equipment operable to produce ammonia, the production equipment comprising a reformer section, a carbon dioxide wash section, and an ammonia synthesis reactor section, the reformer section comprising a primary reformer and a secondary reformer; and controlling the production equipment using the at least one model;

wherein the at least one model represents a plurality of controlled variables and a plurality of manipulated variables, at least one manipulated variable being associated with at least one controlled variable through the at least one model, and wherein the computer readable program code for controlling the production equipment comprises computer readable program code for manipulating the at least one manipulated variable to control the at least one associated controlled variable using the at least one model;

wherein the controlled variables comprise at least one of: a methane slip in the secondary reformer, an exhaust temperature of an air compressor, a heating limit of a stack gas damper in the primary reformer, a carbon dioxide slip in the carbon dioxide wash section, a pressure of an ammonia synthesis reactor, and a valve position in an ammonia synthesis gas compressor; and wherein the manipulated variables comprise at least one of: a steam flow or steam ratio in the primary reformer, an air-to-gas ratio in the secondary reformer, a temperature of a lean solution in the carbon dioxide wash, and a suction pressure of the ammonia synthesis gas compressor.

24. The non-transitory computer readable medium of claim 23, wherein:

the steam ratio in the primary reformer is one of: a steam-to-gas ratio and a steam-to-hydrocarbon ratio;

the controlled variables comprise at least one of: the methane slip in the secondary reformer, the exhaust temperature of the air compressor, and the heating limit of the stack gas damper in the primary reformer; and the manipulated variables comprise at least one of: the steam flow or the steam-to-gas ratio or the steam-to-hydrocarbon ratio in the primary reformer, and the air-to-gas ratio in the secondary reformer.

25. The non-transitory computer readable medium of claim 23, wherein: the controlled variables comprise the carbon dioxide slip in the carbon dioxide wash section; and the manipulated variables comprise the temperature of the lean solution in the carbon dioxide wash.

26. The non-transitory computer readable medium of claim 23, wherein: the controlled variables comprise at least one of: the pressure of the ammonia synthesis reactor and the valve position in the ammonia synthesis gas compressor; and the manipulated variables comprise the suction pressure of the ammonia synthesis gas compressor.

27. The apparatus of claim 1, wherein:

the at least one model also represents at least one disturbance variable; and the at least one processor is configured to determine the manipulation of the at least one manipulated variable while considering the at least one disturbance variable.

* * * * *